(12) United States Patent
Igata et al.

(10) Patent No.: US 10,802,487 B2
(45) Date of Patent: Oct. 13, 2020

(54) DELIVERY SYSTEM

(71) Applicant: Toyota Jidosha Kabushiki Kaisha, Toyota-shi Aichi-ken (JP)

(72) Inventors: Hiroshi Igata, Yokohama (JP); Yuchi Yamanouchi, Toyota (JP); Hidenari Soya, Toyota (JP); Atsushi Sajiki, Okazaki (JP); Satoshi Usui, Machida (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 53 days.

(21) Appl. No.: 16/255,317

(22) Filed: Jan. 23, 2019

(65) Prior Publication Data
US 2019/0227551 A1 Jul. 25, 2019

(30) Foreign Application Priority Data

Jan. 24, 2018 (JP) ................................. 2018-010070

(51) Int. Cl.
| | | |
|---|---|---|
| G06F 7/00 | (2006.01) | |
| G05D 1/00 | (2006.01) | |
| G05D 1/02 | (2020.01) | |
| G06Q 10/08 | (2012.01) | |
| G06Q 20/12 | (2012.01) | |

(52) U.S. Cl.
CPC ......... *G05D 1/0088* (2013.01); *G05D 1/0287* (2013.01); *G06Q 10/0836* (2013.01); *G06Q 20/12* (2013.01); *G05D 2201/0213* (2013.01)

(58) Field of Classification Search
None
See application file for complete search history.

(56) References Cited

U.S. PATENT DOCUMENTS

| | | |
|---|---|---|
| 2006/0111811 A1 | 5/2006 | Okamoto et al. |
| 2006/0111812 A1 | 5/2006 | Okamoto et al. |
| 2006/0112034 A1 | 5/2006 | Okamoto et al. |

(Continued)

FOREIGN PATENT DOCUMENTS

| | | |
|---|---|---|
| JP | 2006-155039 A | 6/2006 |
| JP | 2007-109140 A | 4/2007 |

(Continued)

*Primary Examiner* — Yolanda R Cumbess
(74) *Attorney, Agent, or Firm* — Dinsmore & Shohl LLP

(57) ABSTRACT

The first autonomous mobile object includes a first controller that controls autonomous movement based on an operation command and a first carrying unit that carries the second autonomous mobile object. The second autonomous mobile object includes a second controller that controls autonomous movement based on the operation command, a payment unit that performs payment for merchandise in a designated store, and a second carrying unit that carries the merchandise. The operation command includes a command that causes the first autonomous mobile object carrying the second autonomous mobile object to move to the store, a command that causes the second autonomous mobile object to get off at the store, move into the store, to perform payment for merchandise, and to carry the merchandise, to get on the first autonomous mobile object, and a command that causes the first autonomous mobile object to move to a designated delivery place.

6 Claims, 8 Drawing Sheets

(56) References Cited

U.S. PATENT DOCUMENTS

| | | | |
|---|---|---|---|
| 2006/0116973 A1 | 6/2006 | Okamoto et al. | |
| 2006/0184279 A1 | 8/2006 | Okamoto et al. | |
| 2018/0095467 A1* | 4/2018 | Perrone | B25J 9/1661 |
| 2019/0033868 A1* | 1/2019 | Ferguson | B60R 25/252 |
| 2020/0051001 A1* | 2/2020 | Donnelly | G06Q 10/083 |

FOREIGN PATENT DOCUMENTS

| | | |
|---|---|---|
| JP | 2008-087892 A | 4/2008 |
| JP | 2016-151933 A | 8/2016 |
| WO | 2004/106009 A1 | 12/2004 |

* cited by examiner

FIG. 5

OPERATION COMMAND DATA

| | STORE-TO-VISIT INFORMATION | | PURCHASED ITEM INFORMATION | | | ORDERER INFORMATION | |
|---|---|---|---|---|---|---|---|
| | ID | STORE DATA | ID | NUMBER OF PIECES | NAME OF ITEM | ID | DELIVERY PLACE |
| 1 | STORE A | (DATA) | 4924027333370 | 5 | FIVE PACKAGES OF NOODLES | USER1 | (DATA) |
| 2 | STORE B | (DATA) | N/A | 1 | ONE JAPANESE RADISH | USER1 | (DATA) |
| 3 | ... | | ... | ... | | | |
| ... | | | | | | | |

DELIVERY SYSTEM

CROSS REFERENCE TO THE RELATED APPLICATION

This application claims the benefit of Japanese Patent Application No. 2018-010070, filed on Jan. 24, 2018, which is hereby incorporated by reference herein in its entirety.

BACKGROUND

Technical Field

The present disclosure relates to a goods delivery system using mobile objects.

Description of the Related Art

Various studies have been performed on assistance of robots or mobile objects in human activities such as shopping. For example, Patent Literature 1 in the following citation list discloses a shopping cart that moves autonomously following a user in a shop. Patent Literature 2 discloses a system that includes a plurality of robots that perform the operation of picking up merchandise in a store. Use of this system can reduce the efforts of shopping.

CITATION LIST

Patent Literature

Patent Literature 1: Japanese Patent Application Laid-Open No. 2006-155039
Patent Literature 2: Japanese Patent Application Laid-Open No. 2007-109140
Patent Literature 3: Japanese Patent Application Laid-Open No. 2003-87892
Patent Literature 4: Japanese Patent Application Laid-Open No. 2016-151933
Patent Literature 5: WO/2004/106009

SUMMARY

Recent proliferation of e-commerce has been improving the convenience of customers in doing shopping at home without going to real stores. However, there still are stores that do not provide online shopping and electronic payment service. The only way to do shopping in such stores is to go there actually.

The present disclosure has been made to solve the above problem, and an object of the present disclosure is to provide a system that enables purchase of merchandise without need of going to a real store.

A delivery system according to the present disclosure is a system including a first autonomous mobile object and a second autonomous mobile object, which perform payment for merchandise and receives it in a designated store, and then deliver the merchandise.

Specifically, the first autonomous mobile object comprises a first controller configured to control autonomous movement on roads on the basis of an operation command and a first carrying unit configured to carry the second autonomous mobile object, and the second autonomous mobile object comprises a second controller configured to control autonomous movement on the basis of the operation command, a payment unit configured to perform payment for merchandise in a designated store, and a second carrying unit configured to carry the merchandise for which payment has been completed. The operation command comprises a command that causes the first autonomous mobile object carrying the second autonomous mobile object to move to the store, a command that causes the second autonomous mobile object to get off at the store, a command that causes the second autonomous mobile object to move into the store, to perform payment for the merchandise, and to carry the merchandise, a command that causes the second autonomous mobile object carrying the merchandise to get on the first autonomous mobile object, and a command that causes the first autonomous mobile object to move to a designated delivery place.

The first and second autonomous mobile objects are mobile objects that move autonomously on the basis of an operation command. The first autonomous mobile object is configured to be able to move while carrying the second autonomous mobile object. The first autonomous mobile object is one that is designed to move mainly on roads. An example of the first autonomous mobile object as such is an autonomous vehicle.

The second autonomous mobile object is one that is designed to move mainly inside and outside stores. An example of the second autonomous mobile object as such is an assistant robot that is capable of walking or moving. The second autonomous mobile object has a unit configured to perform payment for merchandise and a unit configured to carry the merchandise for which payment has been completed. The loading of the merchandise onto the second autonomous mobile object may be carried out by either the second autonomous mobile object itself or a clerk in the store. The payment unit of the second autonomous mobile object may perform payment by either transmitting and receiving data relating to electronic payment or paying money in cash. The second autonomous mobile object may be provided with an interface used to inform a store clerk of a method of payment of cash or a method of reading a card.

The operation command is information used to cause each of the autonomous mobile objects to perform a specific movement, and/or action. The operation command may include a command directed to the first autonomous mobile object and a command directed to the second autonomous mobile object. For example, the command directed to the first autonomous mobile object may include information about a store to which the first autonomous mobile object should move, a route to that store, and a place to which merchandise is to be delivered. The command directed to the second autonomous mobile object may include information about the structure of a store to visit, an interior map of the store (indicating the locations of items of merchandise and checkouts etc.), and information about merchandise to be purchased.

According to an operation command, the first and second autonomous mobile objects can execute tasks as follows: (1) the first autonomous mobile object moves to a designated store while carrying the second autonomous mobile object, (2) the second autonomous mobile object gets off the first autonomous mobile object, (3) the second autonomous mobile object purchases merchandise in the store, (4) the second autonomous mobile object gets on the first autonomous mobile object again, and (5) the first autonomous mobile object moves to a place of delivery (e.g. home of a person who requested the delivery). Thus, users of this system can purchase merchandise without going to stores.

The aforementioned payment for merchandise is not limited to payment for purchase or the merchandise. For example, the payment may include payment in exchange for a service relating to an article(s) (e.g. cleaning of clothes).

The delivery system according to the present invention may further include a server apparatus configured to create the operation command based on a request by a user and to send the command to the first autonomous mobile object and the second autonomous mobile object.

As above, the delivery system according to the present disclosure may be constructed as a system including a server apparatus that creates and sends the operation command.

The server apparatus may obtain information designating a store and merchandise from the user and create the operation command based on the information.

The information designating a store may be any information that can specify the destination to which the first autonomous mobile object is to move. For example, this information may be identification data uniquely assigned to the store in advance or the address and the name of the store. The information designating merchandise may be any information that enables the second autonomous mobile object or a clerk of the store who serves the second autonomous mobile object to know the merchandise. For example, this information may be identification data uniquely assigned to the merchandise in advance or text information in normal language.

The server apparatus may obtain payment information used for electronic payment from the user and send the payment information to the payment unit of the second autonomous mobile object, and the second autonomous mobile object may perform payment in the store using the payment information.

The payment information is electronic data used to perform electronic payment. The payment information nay be data about a credit card or electronic money. The payment information may specify the amount of payment, the number of times of payment, and/or the expiration date. The payment unit of the second autonomous mobile object may be configured to be able to give the payment information to the store using an appropriate interface to fulfil payment.

The payment unit of the second autonomous mobile object may be a unit configured to give and receive cash to and from the store and the user, and the second carrying unit may be configured to enable transfer of the merchandise to the user when money for the merchandise is received in cash from the user at the designated delivery place.

The employment of the unit configured to give and receive cash enables payment in cash in stores. In that case, the merchandise may be given to the user on condition that payment in cash is received from the user. For example, the unit for carrying the merchandise may be provided with an electronic lock or the like, and it may be unlocked upon reception of payment in cash.

The second autonomous mobile object may further include an informing unit configured to inform a store clerk of a method of payment and designated merchandise in the store.

The second autonomous mobile object may be adapted to automatically pick up merchandise and perform payment. However, in the stores that are not prepared for such automation, human assistance is needed. Therefore, the second autonomous mobile object may be provided with a unit configured to inform a store clerk of a method of payment (e.g. a place where cash is stored or a method of reading information about a card) and the name of merchandise to be purchased. Such information may be given by, for example, display of a screen or voice.

According to another aspect of the present disclosure, there is provided a delivery system or an autonomous mobile object including at least one of the units described in the foregoing. Moreover, there is also provided a method carried out by the above-described delivery system or the above-described autonomous mobile object. The processes and units described above may be employed in any combinations, as far as it is technically feasible to do so.

The present disclosure can provide a system that enables purchase of merchandise without need of going to a real store.

BRIEF DESCRIPTION OF THE DRAWINGS

FIG. 5 illustrates an example of operation command data.

DETAILED DESCRIPTION

First Embodiment

<Outline of the System>

Figure 1:
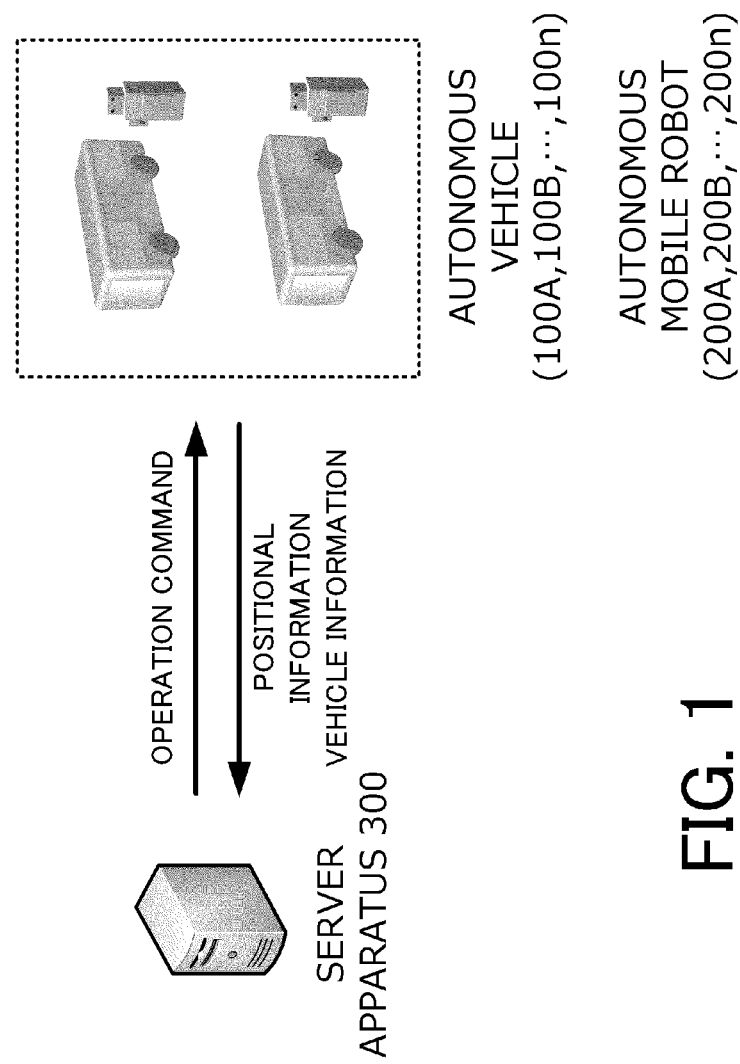
FIG. 1 is a diagram illustrating the general configuration of a delivery system according to a first embodiment.

The outline of a delivery system according to a first embodiment will be described with reference to FIG. 1. The delivery system according to the first embodiment includes a plurality of autonomous vehicles 100A, 100B, . . . 100n that can run autonomously on the basis of commands given thereto and a server apparatus 300 that sends the commands.

In the following, the plurality of autonomous vehicles will be collectively referred to as autonomous vehicles 100, when it is not necessary to distinguish individual vehicles.

The autonomous vehicles 100 are self-driving vehicles that can run with an autonomous mobile robot 200 aboard. The autonomous vehicle 100 is also called an electric vehicle pallet (EV pallet). The autonomous vehicle 100 is not necessarily required to be a vehicle without humans. For example, a sales staff(s), a customer service attendant(s), or an operation monitoring crew(s) may be aboard the vehicle. The autonomous vehicle 100 is not necessarily required to be a vehicle that can run completely autonomously. For example, the autonomous vehicle 100 may be a vehicle that can be driven by a human driver or accept a human assistance in some circumstances.

The autonomous vehicle 100 can pick up or drop off an autonomous mobile robot 200 at a desired place.

The autonomous mobile robot 200 is a robot that can move autonomously after getting off the autonomous vehicle 100 to do a certain task at a place to which it has been brought.

The autonomous vehicle 100 is designed mainly to travel on roads, and the autonomous mobile robot 200 is designed mainly to move inside and outside stores. The autonomous vehicle 100 travels to a desired place and drops off the autonomous mobile robot 200 at that place, and then the autonomous mobile robot 200 moves to a destination. Thus, the autonomous mobile robot 200 is enabled to do a task at a place where vehicles cannot enter (e.g. the interior of a store).

In the system according to the embodiment, in response to a request by a user, the autonomous vehicle 100 carrying the autonomous mobile robot 200 aboard travels to a place near a store designated by the user and drops off the autonomous mobile robot 200 at that place, and the autonomous mobile robot 200 purchases merchandise in that store. Then, the autonomous mobile robot 200 loaded with the purchased merchandise gets on the autonomous vehicle 100 again, and then the autonomous vehicle 100 travels to a place designated by the user. As above, the autonomous vehicle 100 is intended to move in places where it can travel (e.g. roads), and the autonomous mobile robot 200 is intended to move in places where travel of the autonomous vehicle 100 is impossible or inappropriate (e.g. the interior of a store). This system enables a user to do shopping in a real store without actually going there.

The server apparatus 300 is an apparatus that directs the operations of the autonomous vehicles 100 and the autonomous mobile robot 200. For example, in the case of this embodiment, in response to a request by a user, the server apparatus 300 designates a store in which shopping is to be performed and sends to the autonomous vehicle 100 an operation command for shopping at that store. The operation command is shared by the autonomous vehicle 100 and the autonomous mobile robot 200, and the task of "purchasing merchandise in the designated store and delivering the merchandise to a designated place" is carried out.

<System Configuration>

In the following, elements of the delivery system will be described specifically.

Figure 2:
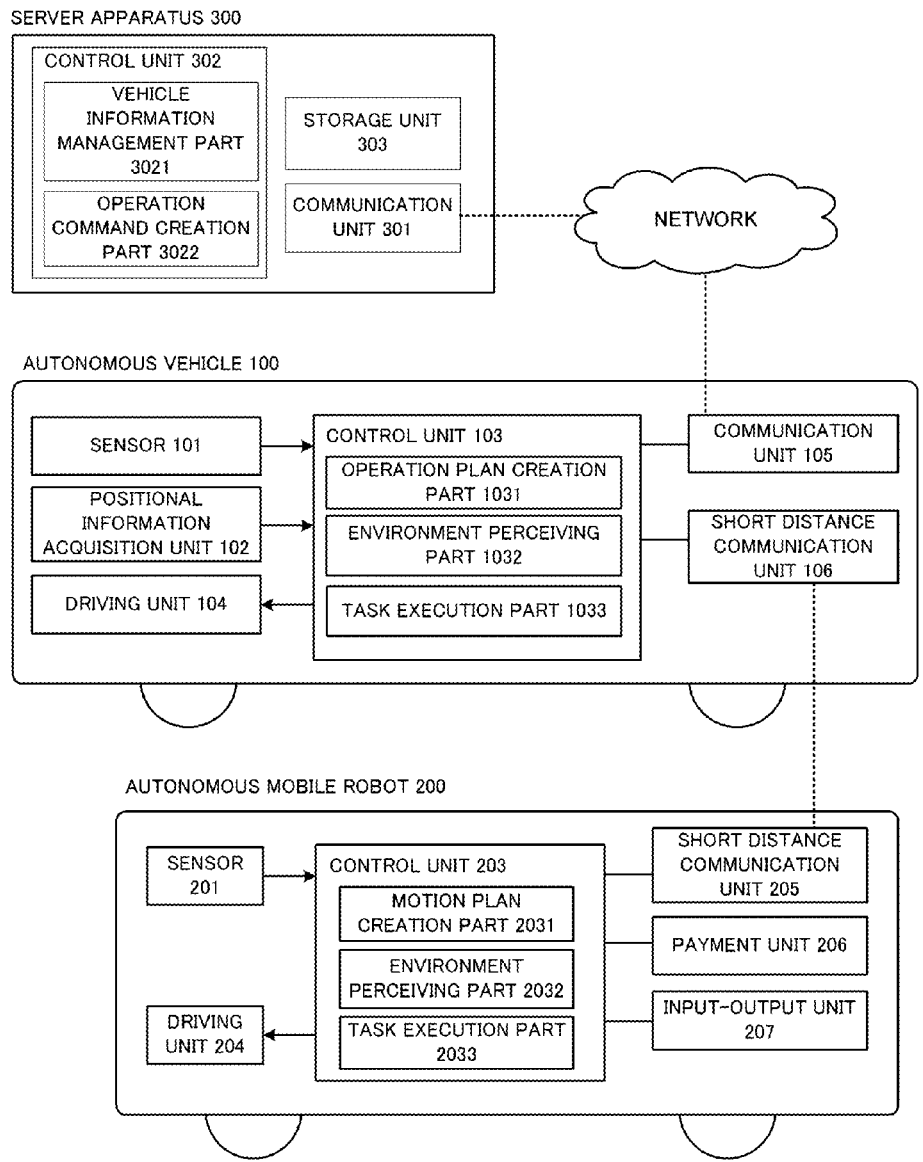
FIG. 2 is a block diagram illustrating the outline of elements included in the delivery system.

FIG. 2 is a block diagram illustrating an exemplary configuration of the autonomous vehicle 100, the autonomous mobile robot 200, and the server apparatus 300 shown in FIG. 1. The delivery system may include a plurality of autonomous vehicles 100 and a plurality of autonomous mobile robots 200.

The autonomous vehicle 100 is a vehicle that travels according to an operation command received from the server apparatus 300. Specifically, the autonomous vehicle 100 creates a travel route on the basis of the operation command received through wireless communication, travels to a designated store, and drops off the autonomous mobile robot 200 at that store. The autonomous mobile robot 200 dropped off from the autonomous vehicle 100 executes the task of doing shopping (namely purchasing merchandise) in that store (which will be hereinafter referred to as the "shopping task") and then returns to the autonomous vehicle 100. The autonomous vehicle 100 picks up the autonomous mobile robot 200 that has done the shopping task and travels to a designated place to deliver the merchandise.

The autonomous vehicle 100 has a sensor 101, a positional information acquisition unit 102, a control unit 103, a driving unit 104, a communication unit 105, and a short distance communication unit 106.

The autonomous vehicle 100 operates by electrical power supplied by a battery.

The sensor 101 is means for sensing the environment of the vehicle, which typically includes a stereo camera, a laser scanner, a LIDAR, a radar, or the like. Information acquired by the sensor 101 is sent to the control unit 103. The sensor 101 includes a sensor(s) used for the purpose of autonomous driving of the autonomous vehicle.

The sensor 101 may include a camera provided on the body of the autonomous vehicle 100. For example, the sensor 101 may include an imaging device using an image sensor such as a charge-coupled device (CCD), metal oxide semiconductor (MOS), or complementary metal oxide semiconductor (CMOS) sensor. The autonomous vehicle 100 may have a plurality of cameras provided on different portions of the vehicle body. For example, the cameras may be provided on the front, rear, and both sides of the vehicle body.

The positional information acquisition unit 102 is means for acquiring the current position of the vehicle, which typically includes a GPS receiver. Information acquired by the positional information acquisition unit 102 is sent to the control unit 103.

The control unit 103 (serving as the first controller) is a computer that controls the autonomous vehicle 100 on the basis of the information acquired by the sensor 101 and the positional information acquisition unit 102. The control unit 103 is constituted by, for example, a microcomputer.

The control unit 103 includes as functional modules an operation plan creation part 1031, an environment perceiving part 1032, and a task execution part 1033. These functional modules may be implemented by executing programs stored in storage means, such as a read only memory (ROM), by a central processing unit (CPU).

The operation plan creation part 1031 receives an operation command from the server apparatus 300 and creates an operation plan of the vehicle. In this embodiment, the operation plan is data that specifies a route along which the autonomous vehicle 100 is to travel and a task(s) to be done by the autonomous vehicle 100 on a part or the entirety of that route. Examples of data included in the operation plan are as follows.

(1) Data Specifying a Route Along which the Vehicle is to Travel by a Set of Road Links The route along which the vehicle is to travel may be created automatically using map data stored in storage means and data of a store designated by the server apparatus 300. Alternatively, the route may be created using an external service.

(2) Data Specifying a Task(s) to be Done by the Vehicle on the Route

Examples of the tasks to be done by the vehicle on the route include, but are not limited to, dropping off an autonomous mobile robot 200, picking up an autonomous mobile robot 200, and delivering goods for purchased merchandise).

The operation plan created by the operation plan creation part 1031 is sent to the task execution part 1033, which will be described later.

The environment perceiving part 1032 perceives the environment around the vehicle using the data acquired by the sensor 101. What is perceived includes, but is not limited to, the number and the position of lanes, the number and the position of other vehicles present around the vehicle, the number and the position of obstacles (e.g. pedestrians, bicycles, structures, and buildings) present around the vehicle, the structure of the road, and road signs. What is perceived may include anything that is useful for autonomous traveling.

The environment perceiving part 1032 may track a perceived object(s). For example, the environment perceiving part 1032 may calculate the relative speed of the object from the difference between the coordinates of the object determined in a previous step and the current coordinates of the object.

The data relating to the environment acquired by the environment perceiving part 1032 is sent to the task execution part 1033 described below. This data will be hereinafter referred to as "environment data".

The task execution part 1033 controls the traveling of the vehicle on the basis of the operation plan created by the operation plan creation part 1031, the environment data acquired by the environment perceiving part 1032, and the positional information of the vehicle acquired by the positional information acquisition unit 102. For example, the task execution part 1033 causes the vehicle to travel along a predetermined route in such a way that obstacles will not enter a specific safety zone around the vehicle. A known autonomous driving method may be employed to drive the vehicle.

The task execution part 1033 may execute tasks other than travelling. Examples of such tasks include picking up and dropping off an autonomous mobile robot 200, and delivering goods (or purchased merchandise) to a user.

The driving unit 104 is means for driving the autonomous vehicle 100 according to a command issued by the task execution part 1033. The driving unit 104 includes, for example, wheels, a motor and inverter for driving the wheels, a brake, a steering system, and a secondary battery.

The communication unit 105 is communication means for connecting the autonomous vehicle 100 to a network. In this embodiment, the communication unit 105 can communicate with other devices (e.g. the server apparatus 300) via a network using a mobile communication service based on e.g. 3G or LTE.

The communication unit 105 may further include communication means for inter-vehicle communication with other autonomous vehicles 100.

The short distance communication unit 106 is a module that provides communication with a short distance communication unit 205 that the autonomous mobile robot 200 has. The short distance communication unit 106 performs communication over short distances (allowing communication in the vehicle's cabin) based on a certain wireless communication standard.

In this embodiment, the short distance communication unit 106 performs data communication based on the Bluetooth (registered trademark) Low Energy standard (BLE). BLE is a version of Bluetooth for low energy communication, which is characterized in that it enables communication to be started immediately upon detection of a device at the other end without need for pairing of devices.

While BLE is used in this embodiment, other wireless communication standards may also be adopted alternatively. For example, NFC (Near Field Communication), UWB (Ultra Wideband), or Wifi (registered trademark) may be adopted.

Figure 3:
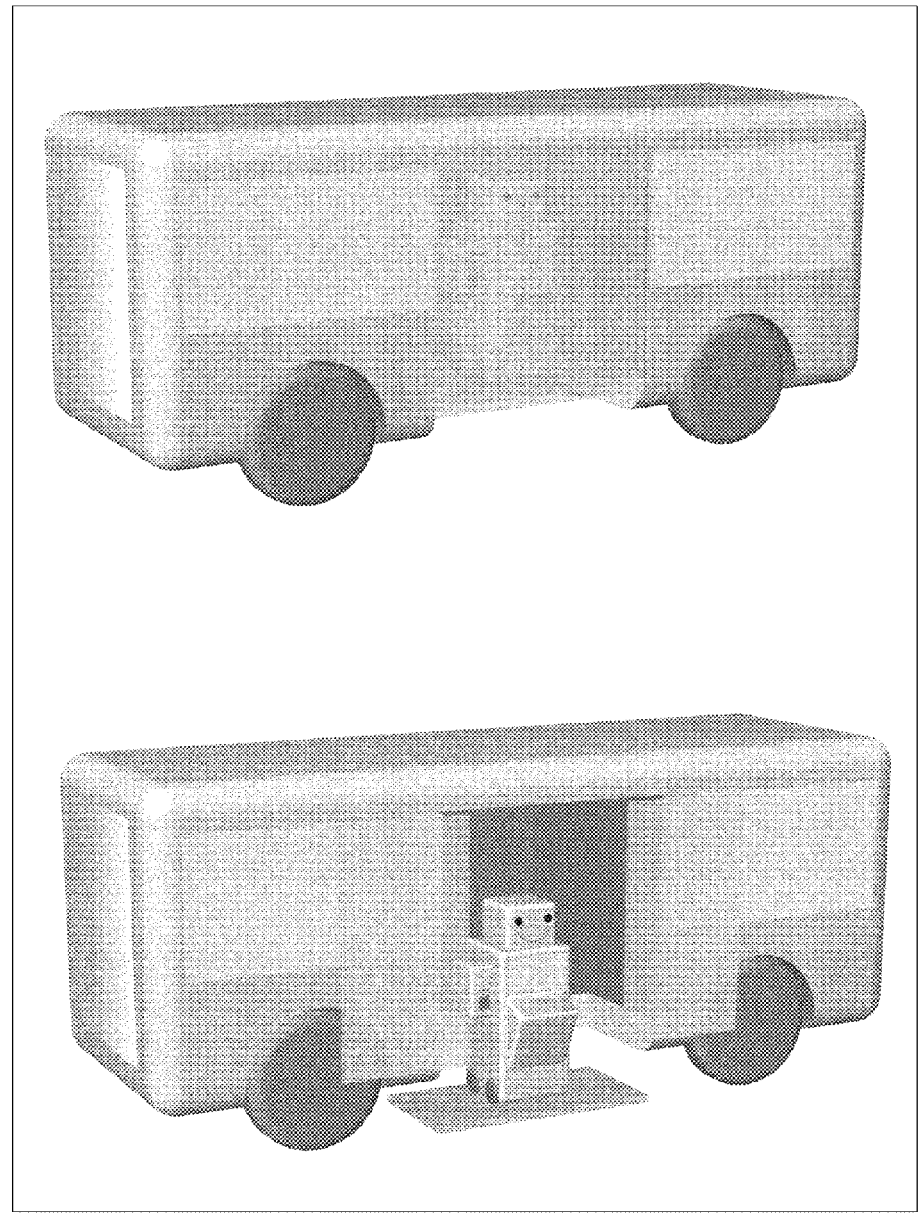
FIG. 3 illustrates the outer appearance of an autonomous vehicle 100.

The autonomous vehicle 100 has means for carrying the autonomous mobile robot 200 (first carrying unit). As illustrated in FIG. 3, the autonomous vehicle 100 can carry the autonomous mobile robot 200 in its cabin. The autonomous vehicle 100 also has an automatically openable side door and an elevator for bringing the autonomous mobile robot 200 up and down. Thus, the autonomous vehicle 100 can pick up and drop off the autonomous mobile robot 200 at desired locations.

Next, the configuration of the autonomous mobile robot 200 will be described.

The autonomous mobile robot 200 is a robot that moves and executes tasks according to an operation command received by the autonomous vehicle 100 from the server apparatus 300. Specifically, the autonomous mobile robot 200 gets off the autonomous vehicle 100 at a designated store, enters the store, and executes a shopping task, that is, the task of purchasing designated items of merchandise in the store. After the completion of the task, the autonomous mobile robot 200 returns to the autonomous vehicle 100.

The autonomous mobile robot 200 has a sensor 201, a control unit 203, a driving unit 204, a short distance communication unit 205, a payment unit 206, and an input-output unit 207. The autonomous mobile robot 200 operates by electrical power supplied by a battery, which is not shown in the drawings.

The sensor 201 is means for sensing the environment of the robot, which typically includes a stereo camera, a laser scanner, a LIDAR, a radar, or the like. Information acquired by the sensor 201 is sent to the control unit 203. The sensor 201 includes a sensor(s) used for the purpose of autonomous motion of the robot.

The control unit 203 (serving as the second controller) is a computer that controls the autonomous mobile robot 200 using information acquired by the sensor 201. The control unit 203 is constituted by, for example, a microcomputer.

The control unit 203 includes as functional modules a motion plan creation part 2031, an environment perceiving part 2023, and a task execution part 2033. These functional modules may be implemented by executing programs stored in storage means, such as a read only memory (ROM), by a central processing unit (CPU), neither of which is shown in the drawings.

As with the autonomous vehicle 100, the motion plan creation part 2031 creates a motion plan on the basis of an operation command received from the server apparatus 300. While the aforementioned operation plan is data that specifies a route along which the autonomous vehicle 100 is to travel and a task(s) to be done on that route, the motion plan is data that specifies a route along which the autonomous mobile robot 200 is to move and a task(s) to be done on that route. Examples of data included in the motion plan are as follows.

(1) Data Specifying a Route Along which the Autonomous Mobile Robot 200 is to Move An example of the route along which the autonomous mobile robot 200 is to move include a route from a parking lot annexed to a store to a certain place in the store and a return route from that place to the parking lot. This data may be created automatically using an interior map of the store stored in storage means (not shown) and the store designated by the server apparatus 300. Alternatively, the data may be created using an external service. In cases where the autonomous mobile robot 200 is capable of moving only on the basis of the result of sensing, it is not necessary to use detailed route data.

(2) Data Specifying a Task(s) to be Done by the Autonomous Mobile Robot 200 on the Route Examples of the tasks to be done by the autonomous mobile robot 200 include, but are not limited to, picking up merchandise, perform payment at a self-service checkout, and communicating with a store clerk (which will be simply referred to as "clerk", hereinafter).

The operation plan created by the motion plan creation part 2031 is sent to the task execution part 2033, which will be described later.

The environment perceiving part 2032 perceives the environment of the autonomous mobile robot 200 using data acquired by the sensor 201. What is perceived includes, but is not limited to, the position of aisles, the number and the position of obstacles (e.g. pedestrians, structures, buildings) present around the autonomous mobile robot 200, and the structure of buildings. What is perceived may include anything that is useful for autonomous motion.

The data relating to the environment acquired by the environment perceiving part 2032 is sent to the task execution part 2033 described below. This data will be hereinafter referred to as "environment data".

The task execution part 2033 controls the movement of the autonomous mobile robot 200 on the basis of the motion plan created by the motion plan creation part 2031 and the environment data acquired by the environment perceiving part 2032. Known technologies may be employed for autonomous movement of the autonomous mobile robot 200.

The task execution part 2033 executes the task of doing shopping in a store using the payment unit 206 and the input-output unit 207, which will be described later. Details of the task will be described later.

The driving unit 204 is means for moving the autonomous mobile robot 200 according to a command created by the task execution part 2033. The driving unit 204 includes, for example, wheels or legs, a motor and inverter for driving the wheels or legs, a brake, a steering system, and a secondary battery.

The short distance communication unit 205 is a module that provides communication with the short distance communication unit 106 of the autonomous vehicle 100. The wireless communication standard used and other features of the short distance communication unit 205 are the same as the short distance communication unit 106.

Figure 4:
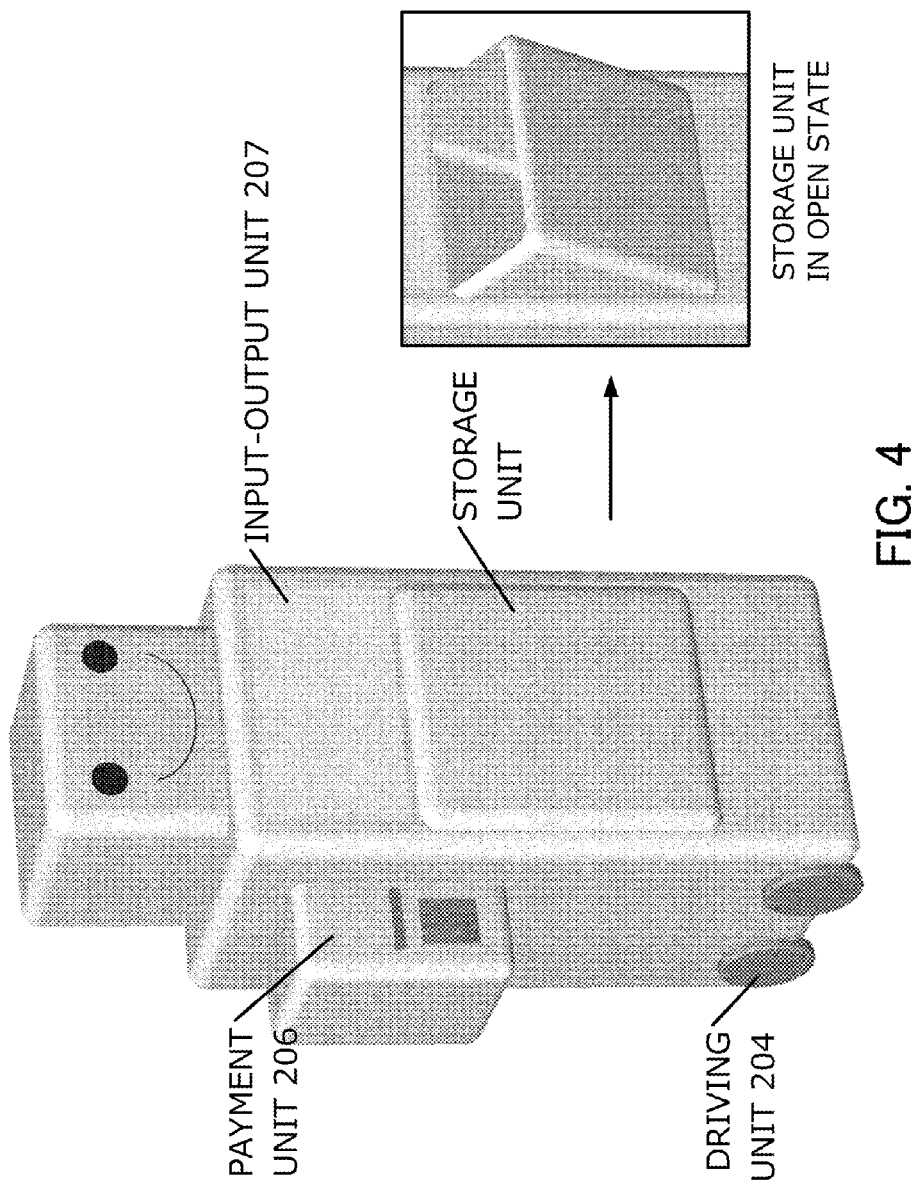
FIG. 4 illustrates the outer appearance of an autonomous mobile robot.

Now, reference is made to FIG. 4 to describe the payment unit 206 and the input-output unit 207. FIG. 4 illustrates the outer appearance of the autonomous mobile robot 200.

The payment unit 206 is means for performing payment in stores. The payment unit 206 according to this embodiment includes a cashbox in which cash is stored and a dispenser unit configured to dispense a designated amount of cash.

The input-output unit 207 is means for communicating with clerks in stores. For example, the input-output unit 207 includes a display device on which images and text messages can be displayed and/or a voice reproducing device that can reproduces voices. The input-output unit 207 may be adapted to receive inputs. For example, the input-output unit 207 may include a touch panel, a microphone, and/or voice recognition means. Such a configuration enables various functions, such as receiving messages from clerks, acquiring supplementary information about merchandise, and providing help to clerks.

The autonomous mobile robot 200 further has a storage unit in the form of a storage compartment in which purchased merchandise is stored.

Next, the server apparatus 300 will be described.

The server apparatus 300 is configured to manage the position of a plurality of running autonomous vehicles 100 and send operation commands. For example, when the server apparatus 300 receives a request (delivery request) from a user, the server apparatus 300 designates a store as the destination and merchandise to be purchased and sends an operation command to an autonomous vehicle 100 located in the neighborhood of that store.

The server apparatus 300 has a communication unit 301, a control unit 302, and a storage unit 303.

The communication unit 301 is a communication interface, similar to the aforementioned communication unit 105, for communication with the autonomous vehicles 100 via a network.

The control unit 302 is means for performing overall control of the server apparatus 300. The control unit 302 is constituted by, for example, a CPU.

The control unit 302 includes as functional modules a vehicle information management part 3021 and an operation command creation part 3022. These functional modules may be implemented by executing programs stored in storage means, such as a ROM, by the CPU.

The vehicle information management part 3021 manages a plurality of autonomous vehicles 100 that are under its management. Specifically, the vehicle information management part 3021 receives positional information from the plurality of autonomous vehicles 100 at predetermined intervals and stores the information in association with the date and time in the storage unit 303, which will be described later. Moreover, the vehicle information management part 3021 holds and updates data about the autonomous vehicles 100, if necessary. This data will be hereinafter referred to as "vehicle information". Examples of the vehicle information include, but are not limited to, the identification data of each autonomous vehicle 100 and information about the service type, the place at which each vehicle is on standby (e.g. car shed or service office), the door type, the vehicle body size, the carrying capacity, the full charge driving range, the present (or remaining) driving range, and the present status (such as empty, occupied, running etc.).

When a request for delivery by an autonomous vehicle 100 is received from outside, the operation command creation part 3022 determines the autonomous vehicle 100 to be dispatched and creates an operation command according to the delivery request. The delivery request is received from a user, for example, via a network. The sender of a delivery request is not necessarily an ordinary user. For example, the organization that provides the service with the autonomous vehicles 100 may send a delivery request.

The delivery request includes, for example, the following items, but are not limited to them.

information designating a store (store-to-visit information)

information designating an item to be purchased (purchased item information)

information about the person who has placed the order or request (orderer information)

FIG. 5 illustrates an exemplary operation command created on the basis of the above information.

The store-to-visit information includes identification data that identifies a store and data relating to the store (store data). The identification data may be defined in advance. Alternatively, the identification data may be data that directly represents the location of the store, such as the address of the store or the coordinates of the location of the store. The store data may include information about the business hours of the store and/or an interior map of the store.

The purchased item information includes identification data that identifies the item to be purchased, the number of pieces of the item to be purchased, and the name of the item. The identification data may be data or a code that uniquely identifies the item, an example of which is JAN code (Japanese Article Number Code). In the case where no unique code is assigned to an item, the identification data field for that item may be left blank (N/A). In that case, it is desirable that a specific name of the item be given in order for a clerk to know the item.

The orderer information includes information that identifies the person who has placed the order and information about the place to which the purchased merchandise is to be delivered.

The autonomous vehicle 100 to which the operation command is sent is determined on the basis of, for example, the positional information of the vehicles and the vehicle information of them (indicating whether each vehicle can fulfil the required task or not), which the vehicle information management part 3021 has received.

The storage unit 303 is means for storing information, which is constituted by a storage medium such as a RAM, a magnetic disc, or a flash memory.

<Operation Based on Operation Command>

Figure 6:
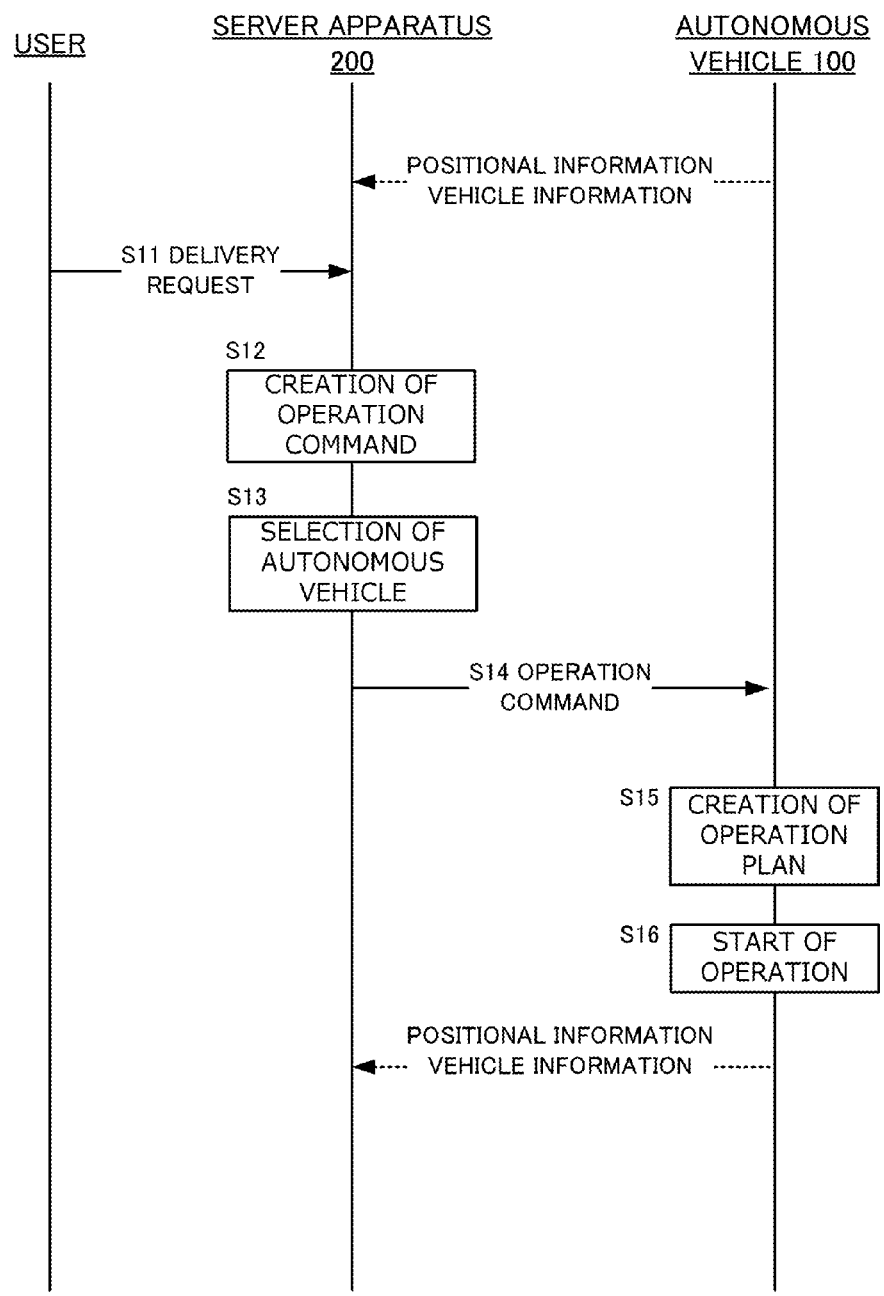
FIG. 6 is a diagram illustrating data sent between elements of the system and processing executed by the elements.

Processing that is performed by each of the above-described components will now be described. FIG. 6 is a diagram illustrating dataflow during a process in which the server apparatus 300 creates an operation command based on a request by a user and an autonomous vehicle 100 starts its operation.

The autonomous vehicle 100 periodically sends positional information to the server apparatus 300. For example, in the case where the road network is defined by nodes and links, the positional information may be information that specifies a node or a link. The vehicle information management part 3021 stores the association of the autonomous vehicle 100 with the positional information sent to the server apparatus 300 in the storage unit 303. The road network is not necessarily a network represented by nodes and links. The positional information is updated every time the autonomous vehicle 100 moves.

The autonomous vehicle 100 periodically sends vehicle information to the server apparatus 300. In this embodiment, the vehicle information sent by the autonomous vehicle 100 includes the following information. Among the following kinds of information, the information about characteristics intrinsic to the autonomous vehicle 100 does not need to be sent repeatedly.

information about the capacity of the vehicle (load volume capacity, load weight capacity, etc.)

information about the freight the vehicle is currently carrying (volume, weight, etc.)

information about the remaining battery capacity (SOC)

information about the driving range information about the travel route (if the vehicle is operating)

information about goods that are planned to be added as loads on the travel route (volume, weight, loading location)

If a user sends a delivery request to the server apparatus 300 by communication means (step S11), the server apparatus 300 (specifically, the operation command creation part 3022) creates an operation command according to the delivery request (step S12).

In step S13, the operation command creation part 3022 selects an autonomous vehicle 100 that is to provide the service. For example, the operation command creation part 3022 selects an autonomous vehicle 100 that can provide the requested service with reference to the stored positional information and vehicle information of the autonomous vehicles 100.

In step S14, the server apparatus 300 sends an operation command to the autonomous vehicle 100 selected as above. The operation command is shared by the autonomous vehicle 100 and the autonomous mobile robot 200 using their short distance communication units 106 and 205.

In step S15, the autonomous vehicle 100 (specifically, the operation plan creation part 1031) and the autonomous mobile robot 200 (specifically, the motion plan creation part 2031) create respective operation plans on the basis of the received operation command. For example, the autonomous vehicle 100 creates an operation plan including the steps of:

creating a travel route to a location in front of (or a parking lot of) a designated store, traveling to that store, dropping off the autonomous mobile robot 200, picking up the autonomous mobile robot 200 that has completed its shopping task, and travelling to a designated delivery place.

The autonomous mobile robot 200 creates an operation plan including the steps of:

getting off the autonomous vehicle 100 at the designated store, creating a travel route including a route from the autonomous vehicle 100 to the store and a return route from the store to the autonomous vehicle 100 using store data (e.g. an interior map of the store), moving into the store and executing a shopping task, and returning to the autonomous vehicle 100 after completing the shopping task.

There are different ways of executing shopping tasks by the autonomous mobile robot 200, as follows.

(1) Execution of Tasks without Human Assistance

This applies to cases where stores are prepared for picking-up of merchandise and payment by robots. Specifically, for example, each item of merchandise has a tag attached to it to enable robots to identify the item, and the store system is configured to enable automatic payment. In such cases, the autonomous mobile robot 200 can pick up merchandise on the basis of the purchased item information and complete the payment by itself. To this end, the autonomous mobile robot 200 may be equipped with means for picking up merchandise and means for giving and receiving cash or a card, though not illustrated in FIG. 4.

(2) Execution of Tasks with Human Assistance

In the case of stores that do not have the above-described features, it is necessary that picking-up of merchandise and the checking-out process be carried out by a store clerk. In that case, for example, the name of merchandise to be purchased is made known to the clerk by the input-output unit 207, and payment is performed using the payment unit 206. For example, the autonomous mobile robot 200 may be configured to pay an amount of money in cash through the dispenser unit built in the payment unit 206 in response to an input of the figure of the total price of purchase made on the input-output unit 207. The purchased merchandise is put into the storage unit by the clerk.

In both the cases, it is desirable that a paper or electronic receipt or the like serving as an evidence of the payment be received and stored physically or electronically.

The operation plan and the motion plan created as above are sent to the task execution part 1033 and the task execution part 2033 respectively, and then the operation is started (step S16). During the operation also, the positional information and the vehicle information are sent to the server apparatus 300 periodically.

Figure 7:
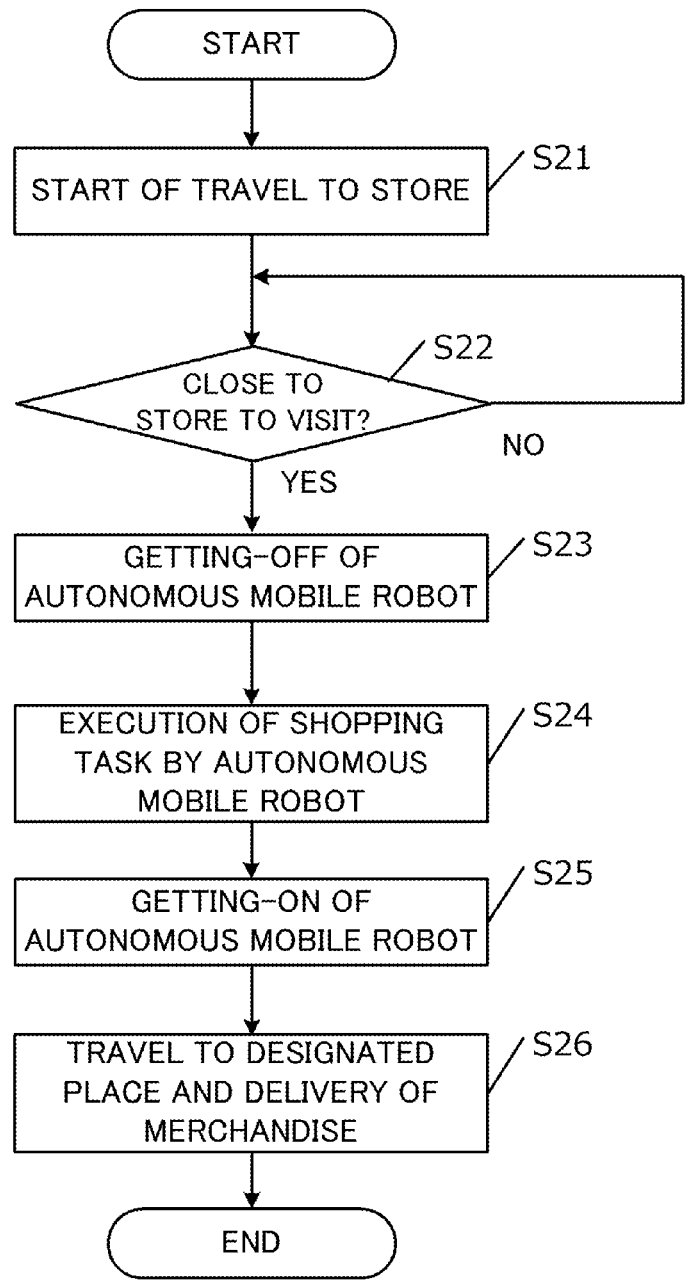
FIG. 7 is a flow chart of a process executed by the autonomous vehicle and the autonomous mobile robot.

FIG. 7 is a flow chart of a process performed by the autonomous vehicle 100 and the autonomous mobile robot 200 after the start of the operation in step S16.

Firstly in step S21, the autonomous vehicle 100 (specifically, the task execution part 1033) starts to travel for a designated store according to the operation plan created as above.

When the autonomous vehicle 100 comes near to the store to visit (step S22), the autonomous vehicle 100 (specifically, the task execution part 1033) searches for a place where it can be parked and stops at that place to drop off the autonomous mobile robot 200 (step S23). In cases where the place of dropping-off of the autonomous mobile robot 200 is in a no-parking zone, the autonomous vehicle 100 may move to an appropriate parking place. In that case, the autonomous vehicle 100 may return to the place of dropping off later in synchronization with the completion of the shopping task by the autonomous mobile robot 200. During the period through which the autonomous mobile robot 200 is executing the shopping task, the autonomous vehicle 100 may execute a task that is not related to the shopping.

Then, the autonomous mobile robot 200 (specifically, the task execution part 2033) executes the task of doing shopping in the store according to the motion plan. (step S24).

Figure 8:
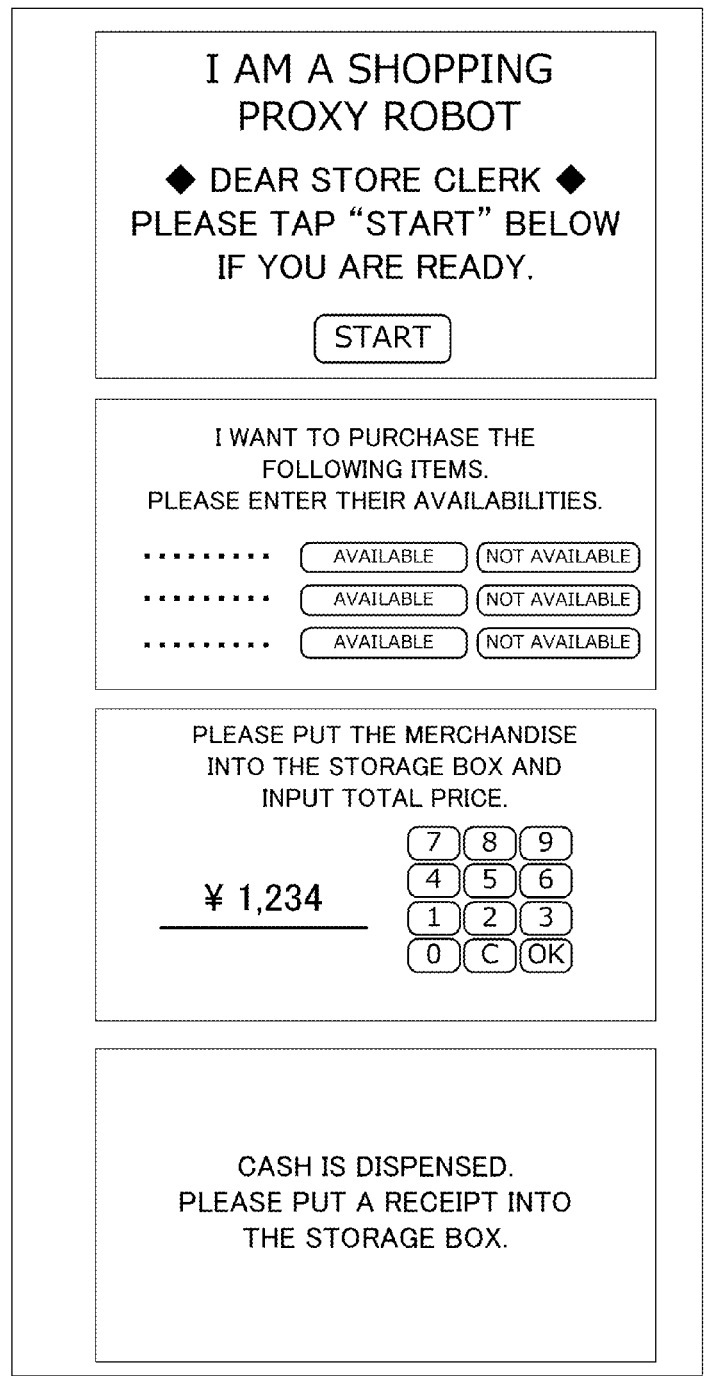
FIG. 8 illustrates exemplary screens displayed on an input-output unit 207.

As described above, the shopping task may be carried out automatically or with assistance of a clerk. In the case where the shopping is assisted by a clerk, the autonomous mobile robot 200 may display screens shown in FIG. 8 by the input-output unit 207 to ask the clerk to carry out picking-up of merchandise and the checking-out process.

After the completion of the task, the autonomous vehicle 100 (specifically, the task execution part 1033) picks up the autonomous mobile robot 200 (step S25) and then travels to the place of delivery specified by the orderer information to deliver the purchased merchandise (seep S26).

The autonomous mobile robot 200 may be adapted to receive cash using the payment unit 206 in the delivery process and unlock the storage unit after receiving money in cash from the user. In the case where the autonomous mobile robot 200 has a receipt it has received in the store or data about the details of checking-out it has received, the autonomous mobile robot 200 may present the receipt or the data to the user to enable him/her to check the details.

As above, the system according to the first embodiment employs the autonomous vehicle 100 that mainly travels on roads and the autonomous mobile robot 200 that mainly moves in places other than roads in combination to enable shopping in real stores. In other words, the combined use of an autonomous mobile object specialized for travel over middle or long distances and an autonomous mobile object specialized for execution of tasks in stores enables shopping without need for users to go to real stores.

Second Embodiment

While in the first embodiment the payment unit 206 of the autonomous mobile robot 200 performs payment in cash, in the second embodiment payment is performed electronically using information received from the user in advance.

Apart from the method of payment performed electronically, the configuration of a delivery system according to the second embodiment is the same as that according to the first embodiment.

In the delivery system according to the second embodiment, the server apparatus 300 holds information about the method of electronic payment of each of the users, and when creating an operation command in step S12, the server apparatus 300 adds data for electronic payment to the operation command.

Examples of the data for electronic payment include, but are not limited to, information about a credit card or a debit card, and information about electronic money or virtual money. In cases where purchase is performed in a store having a system that scans personal identification information in the store and accomplishes the checking-out automatically as merchandise is brought out from the store, the data for electronic payment may be the personal identification information.

In the system according to the second embodiment, the autonomous mobile robot 200 has means for transmitting and receiving data used for electronic payment to and from stores. The transmission and reception of data may be performed electronically (e.g. by wireless communication) or using a medium, such as a magnetic card or an IC card. For example, the payment unit 206 may be configured to make and discharge a magnetic card or an IC card to be used for payment, and a store clerk may carry out the payment process using this. In some embodiments, this card is one having a limitation about payment (e.g. a card that can be used only once or a card that allows only payment within a predetermined amount limit).

According to the second embodiment, since the payment is carried out using electronic payment based on information entered in advance, the robot can fulfil shopping tasks without handling cash.

Modification

The above embodiments have been described merely as illustrative examples, to which various modifications can be made without departing from the essence of the present disclosure.

For example, while illustrative systems relating to purchase of merchandise in stores have been described as embodiments, the present disclosure can also be applied to any systems that deliver goods to a designated place from a store, apart from purchase. For example, the present disclosure may be applied to a system that performs transfer of goods in a store.

The autonomous mobile robot 200 need not be a robot capable of moving completely autonomously. For example, the autonomous mobile robot 200 may operate with remote assistance by a user. Specifically, the autonomous mobile robot 200 may be configured to provide results of sensing or images captured by a camera to the user so that user can designate a place to which the robot 200 should move and give a task to be done by the robot 200, and the robot 200 may operate according to the user's instructions. In other words, the autonomous mobile robot 200 may be one that moves semi-autonomously. In that case, purchase of merchandise using the autonomous robot 200 can be performed even in cases where detailed data (e.g. an interior map) about the store is not available.

While one autonomous vehicle 100 and one autonomous mobile robot 200 are paired in the system according to the above described embodiments, they are not necessarily required to be paired. For example, the autonomous vehicle 100 that carries an autonomous mobile robot 200 to a store and the autonomous vehicle 100 that carries that autonomous mobile robot 200 in the return travel from the store may be different from each other.

While in the above description of the embodiments, shopping tasks have been discussed by way of example, the autonomous vehicle 200 may execute other tasks. For example, the autonomous mobile robot 200 may execute the task of waiting in line to purchase a designated item of merchandise.

What is claimed is:

1. A delivery system including a first autonomous mobile object and a second autonomous mobile object,
    the first autonomous mobile object comprising:
      a first controller configured to control autonomous movement of the first autonomous mobile object on roads based on an operation command; and a first carrying unit configured to carry the second autonomous mobile object, the second autonomous mobile object comprising:

a second controller configured to control autonomous movement of the second autonomous mobile object based on the operation command;

a payment unit configured to perform payment for merchandise in a designated store; and a second carrying unit configured to carry the merchandise for which payment has been completed, the operation command comprising:

a command that causes the first autonomous mobile object carrying the second autonomous mobile object to move to the store;

a command that causes the second autonomous mobile object to get off of the first autonomous mobile object at the store;

a command that causes the second autonomous mobile object to move into the store, to perform payment for the merchandise, and to carry the merchandise;

a command that causes the second autonomous mobile object carrying the merchandise to get on the first autonomous mobile object; and a command that causes the first autonomous mobile object to move to a designated delivery place.

2. A delivery system according to claim 1, further comprising:

a server apparatus configured to create the operation command based on a request by a user and to send the operation command to the first autonomous mobile object and the second autonomous mobile object.

3. A delivery system according to claim 2, wherein the server apparatus obtains information designating a store and merchandise from the user and creates the operation command based on the information.

4. A delivery system according to claim 2, wherein the server apparatus obtains payment information used for electronic payment from the user and sends the payment information to the payment unit of the second autonomous mobile object, and the second autonomous mobile object performs payment in the store using the payment information.

5. A delivery system according to claim 1, wherein the payment unit of the second autonomous mobile object is a unit configured to give and receive cash to and from the store and the user, and the second carrying unit is configured to enable transfer of the merchandise to the user when money for the merchandise is received in cash from the user at the designated delivery place.

6. A delivery system according to claim 1, wherein the second autonomous mobile object further comprises an informing unit configured to inform a store clerk of a method of payment and designated merchandise in the store.

\* \* \* \* \*

UNITED STATES PATENT AND TRADEMARK OFFICE
CERTIFICATE OF CORRECTION

PATENT NO. : 10,802,487 B2  
APPLICATION NO. : 16/255317  
DATED : October 13, 2020  
INVENTOR(S) : Hiroshi Igata et al.

Page 1 of 1

It is certified that error appears in the above-identified patent and that said Letters Patent is hereby corrected as shown below:

On the Title Page

Item (72), inventor 1, city, delete "Yokohama" and insert --Yokohama-shi, Kanagawa-ken--, therefor.

Item (72), inventor 2, city, delete "Toyota" and insert --Toyota-shi, Aichi-ken--, therefor.

Item (72), inventor 3, city, delete "Toyota" and insert --Toyota-shi, Aichi-ken--, therefor.

Item (72), inventor 4, city, delete "Okazaki" and insert --Okazaki-shi, Aichi-ken--, therefor.

Item (72), inventor 5, city, delete "Machida" and insert --Machida-shi, Tokyo-to--, therefor.

In the Specification

In Column 1, Line(s) 37, delete "2003-87892" and insert --2008-87892--, therefor.

In Column 3, Line(s) 34, delete "nay" and insert --may--, therefor.

In Column 6, Line(s) 48, delete "for" and insert --(or--, therefor.

In Column 13, Line(s) 27, delete "seep" and insert --step--, therefor.

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*